United States Patent
Abe et al.

(10) Patent No.: US 6,565,267 B2
(45) Date of Patent: May 20, 2003

(54) OPTICAL TRANSMITTING DEVICE AND OPTICAL RECEIVING DEVICE EACH HAVING RECEPTACLE TYPE OPTICAL MODULE

(75) Inventors: Akio Abe, Kawasaki (JP); Kazuya Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/962,244

(22) Filed: Sep. 26, 2001

(65) Prior Publication Data
US 2002/0168152 A1 Nov. 14, 2002

(30) Foreign Application Priority Data
May 8, 2001 (JP) ........................................ 2001-137385

(51) Int. Cl.[7] .............................. G02B 6/36; G02B 6/00
(52) U.S. Cl. ......................................... 385/88; 264/1.25
(58) Field of Search ........................... 264/1.25, 272.14, 264/272.15, 275, 279; 385/5, 52, 70, 88, 89, 73, 90, 147, 49, 51, 92, 94

(56) References Cited

U.S. PATENT DOCUMENTS

| 5,583,377 A | 12/1996 | Higgins |
| 5,659,200 A | 8/1997 | Yoshimoto et al. |
| 5,875,047 A | 2/1999 | Abe et al. |
| 6,220,764 B1 * | 4/2001 | Kato et al. ................. 264/1.25 |
| 6,282,352 B1 * | 8/2001 | Kato et al. ................. 264/1.25 |
| 6,296,789 B1 * | 10/2001 | Go et al. ................... 264/1.25 |

FOREIGN PATENT DOCUMENTS

| JP | 11-340402 | 12/1999 |
| JP | 2000-009970 | 1/2000 |

* cited by examiner

Primary Examiner—Akm E. Ullah
(74) Attorney, Agent, or Firm—Staas & Halsey LLP

(57) ABSTRACT

An optical receiving device including a lead frame, a printed wiring board mounted on the lead frame and having a ground pattern, a ferrule assembly fixedly mounted on the lead frame and having a ceramic capillary, and a photodetecting element fixedly mounted on an end surface of the ceramic capillary. The optical receiving device further includes a preamplifier IC mounted on the printed wiring board, a wire for connecting the photodetecting element and the preamplifier IC, and an internal shield fixedly mounted on the ground pattern of the printed wiring board for covering the preamplifier IC and the wire. These components except a part thereof are enclosed by a resin mold package.

12 Claims, 16 Drawing Sheets

F I G.13
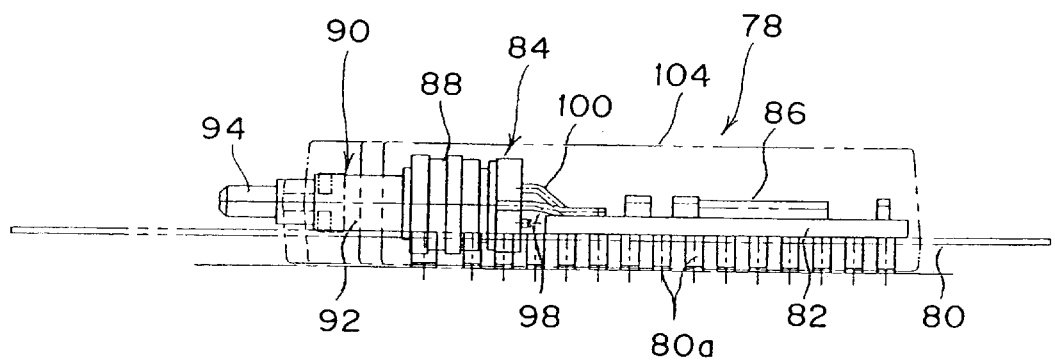

OPTICAL TRANSMITTING DEVICE AND OPTICAL RECEIVING DEVICE EACH HAVING RECEPTACLE TYPE OPTICAL MODULE

BACKGROUND OF THE INVENTION

1. Field of the Invention

The present invention relates to an optical transmitting device and an optical receiving device each having a receptacle type optical module.

2. Description of the Related Art

In a recent information communications field, massive amounts of information are required to be transmitted at high speed with an increase in amount of information, and the widespread use of high-speed high-capacity optical communication networks including an optical subscriber system is now proceeding. To achieve the widespread use of an optical subscriber system, a reduction in cost of an optical module is indispensable. The cost of the optical module includes a members cost, assembly cost, test cost, and adjustment cost. In particular, the assembly cost and the adjustment cost occupy a large proportion of the total cost. As means for reducing the assembly cost, a receptacle type optical module has been in the limelight in recent years.

Conventionally, among optical devices, a pigtail type optical module having such a structure that an optical fiber is attached to the end of an optical device is mainly used in general. However, in reducing the size and cost of the optical module, the presence of the pigtail fiber becomes a large bottleneck. For example, in the case of mounting the optical module in a communication device, a forming process for the optical fiber is necessary. Further, in carrying the optical module, merely storing the optical module into a carrying case requires a handling operation and a considerable number of man-hours. Further, in the case of automating the assembly of the optical module, the presence of the pigtail fiber becomes a bottleneck to full automation.

Further, in mounting an optical module on a printed wiring board in a soldering process as mounting surface-mount components or through-hole mount components, a so-called pigtail type optical module having an optical fiber cord is not suitable. That is, the optical fiber cord usually has a nylon coating, which has low heat resistance as melting at about 80° C. in the soldering process. Further, the optical fiber cord itself causes a problem on accommodation and handling at a manufacture site, thus remarkably reducing an efficiency of mounting of the optical module on the printed wiring board.

Accordingly, to allow the soldering process for the optical module and reduce a manufacturing cost, the provision of a so-called receptacle type optical module having no optical fiber cord is indispensable. The receptacle type optical module has a connector portion adapted to detachably connect an optical fiber cord with a coating weak to heat. Since the receptacle type optical module has no optical fiber cord, high-temperature reflow soldering can be applied, so that the optical module can be mounted on a printed wiring board simultaneously with the mounting of surface-mount electronic components.

U.S. Pat. No. 5,875,047 discloses an optical transceiver unit. This conventional optical transceiver unit is assembled in the following manner. First, a printed wiring board is manually fitted to a lower case. Optical components are next manually mounted on the printed wiring board, and stop rings are manually mounted on the optical components to fix them. Finally, an upper case is manually fitted to the lower case, thus completing the assembly of the optical transceiver unit. In this optical transceiver unit disclosed in U.S. Pat. No. 5,875,047, the assembly is dependent on manual operations, causing a reduction in assembly workability, it is therefore desired to improve the assembly workability. Moreover, ground enhancement to the upper case is required for further improvement of the immunity to electromagnetic interference.

SUMMARY OF THE INVENTION

It is therefore an object of the present invention to provide an optical receiving device improved in the immunity to electromagnetic interference.

It is another object of the present invention to provide an optical transmitting device and an optical receiving device improved in the assembly workability.

In accordance with an aspect of the present invention, there is provided an optical device comprising a lead frame having a plurality of leads; a printed wiring board mounted on said lead frame and having a ground pattern; a ferrule assembly including a metal member, optical fiber holding means fixed to said metal member and having a through hole, and an optical fiber inserted and fixed in said through hole of said optical fiber holding means, said metal member being fixed to said lead frame; a semiconductor optical element fixedly mounted on an end face of said optical fiber held by said optical fiber holding means; an electrical circuit mounted on said printed wiring board; a wire for connecting said semiconductor optical element and said electrical circuit; an internal shield fixedly mounted on said ground pattern of said printed wiring board for covering said electrical circuit and said wire; and a resin mold package for enclosing all of said lead frame, said printed wiring board, said electrical circuit, said semiconductor optical element, said wire, said internal shield, and said ferrule assembly except a part of each of said leads, a part of said optical fiber holding means, and a part of said metal member.

The electrical circuit and the wire are covered with the internal shield, thereby improving the immunity to electromagnetic interference in an area where a feeble signal is passed. Preferably, the internal shield is formed of metal, and has a cutout for allowing injection of a molding resin into the internal shield and at least one air vent. Accordingly, the molding resin can be efficiently injected into the internal shield.

Preferably, the metal member has a cylindrical portion, and the resin mold package seals the ferrule assembly at the cylindrical portion. With this structure, a resin burr generated in a molding process is prevented from sticking to the optical fiber holding means such as a ceramic capillary, thereby allowing a reduction in connection loss by an optical connector.

In accordance with another aspect of the present invention, there is provided an optical device comprising a lead frame having a plurality of leads; a printed wiring board mounted on said lead frame; a ferrule assembly including a metal member, optical fiber holding means fixed to said metal member and having a through hole, and an optical fiber inserted and fixed in said through hole of said optical fiber holding means, said metal member being fixed to said lead frame; a semiconductor optical element fixedly mounted on an end face of said optical fiber held by said optical fiber holding means; an electrical circuit mounted on said printed wiring board; a wire for connecting said semiconductor optical element and said electrical circuit; a resin mold package for enclosing all of said lead frame, said printed wiring board, said electrical circuit, said semiconductor optical element, said wire, and said ferrule assembly except a part of each of said leads, a part of said optical fiber holding means, and a part of said metal member; and an external shield mounted on said resin mold package so as to cover said resin mold package.

Preferably, the external shield is fixed by welding at a plurality of positions to the leads. Preferably, the metal member has a cylindrical portion, and the resin mold package seals the ferrule assembly at the cylindrical portion.

In accordance with a further aspect of the present invention, there is provided an optical device comprising a lead frame having a plurality of leads; a printed wiring board mounted on said lead frame; an optical element module including an optical element package having a semiconductor optical element, and a ferrule assembly having: a metal member, optical fiber holding means inserted and fixed in said metal member, and an optical fiber inserted and fixed in said optical fiber holding means, said metal member being fixed to said optical element package and fixedly mounted on said lead frame; an electrical circuit mounted on said printed wiring board; and a resin mold package for enclosing all of said lead frame, said printed wiring board, said electrical circuit, and said optical element module except a part of each of said leads, an end portion of said optical fiber holding means, and a part of said metal member.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 13 is a front view of the optical transmitting device in the condition after lead forming;

DETAILED DESCRIPTION OF THE PREFERRED EMBODIMENTS

Figure 1:
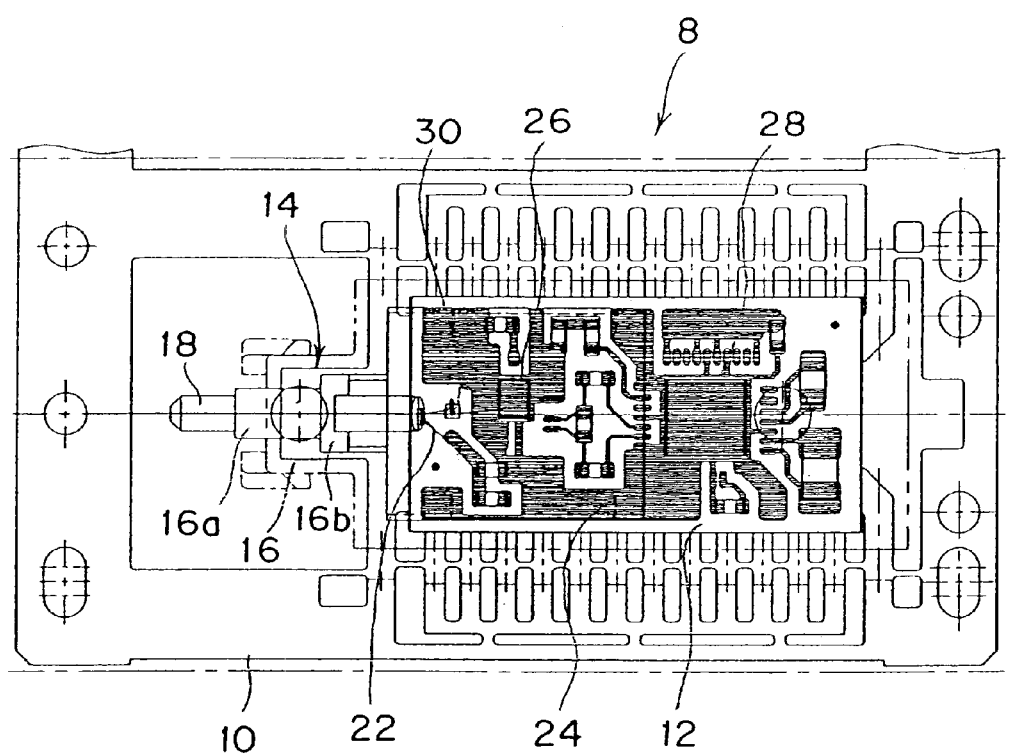
FIG. 1 is a top plan view of an optical receiving device according to a first preferred embodiment of the present invention in the condition before lead forming.
Figure 2:
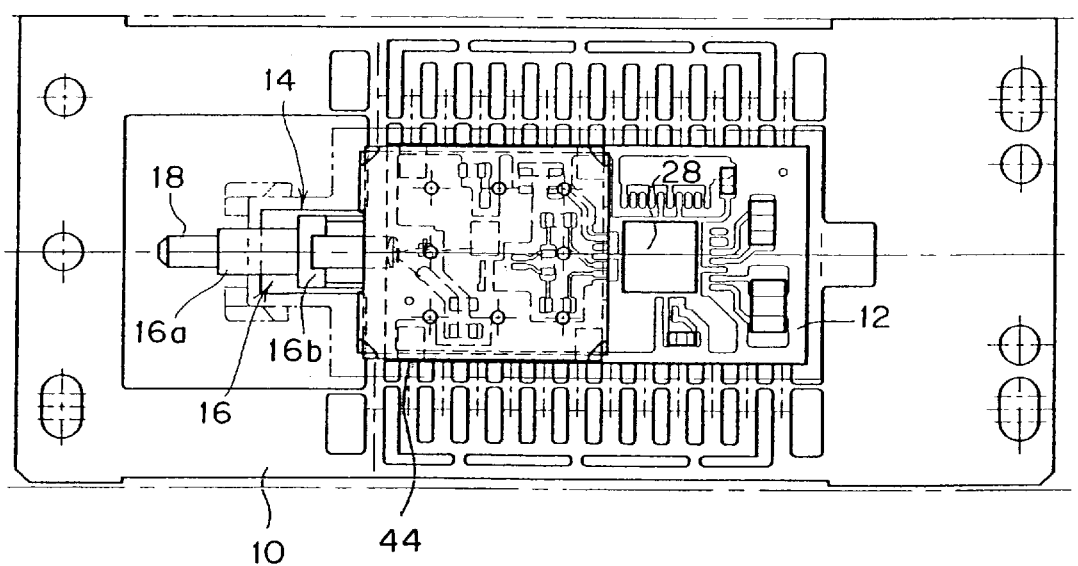
FIG. 2 is a top plan view similar to FIG. 1, showing a condition where an internal shield is mounted.
Figure 3A:
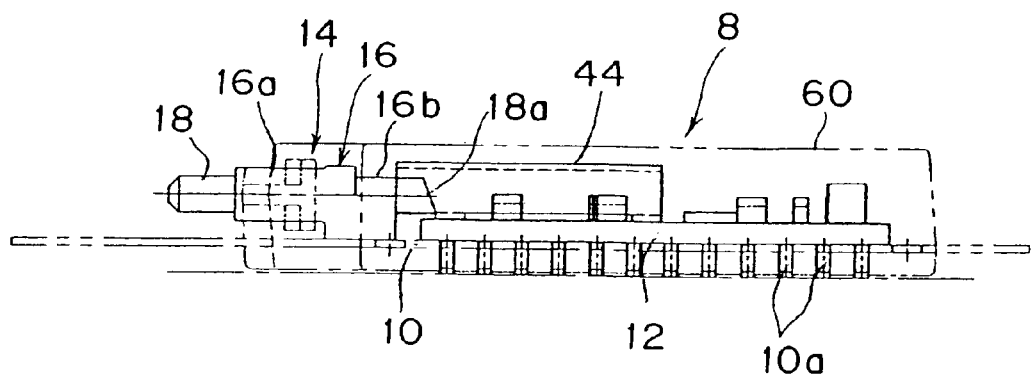
FIG. 3A is a front view of the optical receiving device in the condition after lead forming.
Figure 3B:
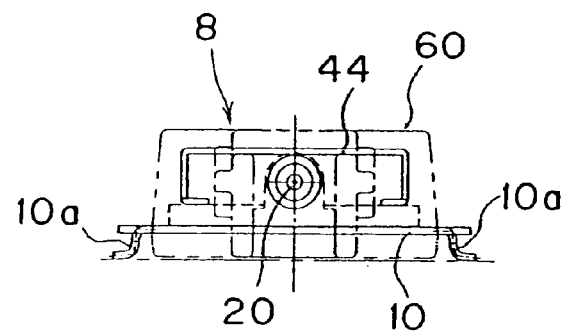
FIG. 3B is a left side view of FIG. 3A.

A first preferred embodiment of the optical receiving device according to the present invention will now be described with reference to FIGS. 1 to 6B. FIG. 1 is a top plan view of an optical receiving device 8 according to the first preferred embodiment in the condition before lead forming. FIG. 2 is a top plan view similar to FIG. 1, showing a condition where an internal shield is mounted. FIG. 3A is a front view of the optical receiving device 8 in the condition after lead forming, and FIG. 3B is a left side view of FIG. 3A. As best shown in FIG. 3A, a printed wiring board 12 and a ferrule assembly 14 are fixedly mounted on a lead frame 10 having a plurality of leads 10a. The printed wiring board 12 and the ferrule assembly 14 are automatically mounted on the lead frame 10 by using an automated mounter.

The ferrule assembly 14 includes a metal member 16 having a bore, and a ceramic (e.g., zirconia) capillary 18 inserted in the bore of the metal member 16. The metal member 16 has a cylindrical portion 16a and a rectangular parallelepiped portion 16b. The ceramic capillary 18 has an axially extending through hole and functions as optical fiber holding means. The ferrule assembly 14 is fixed to the lead frame 10 by welding the rectangular parallelepiped portion 16b of the metal member 16 to the lead frame 10. The ceramic capillary 18 is fixed in the bore of the metal member 16 in such a manner that the opposite ends of the ceramic capillary 18 project from the metal member 16.

An optical fiber 20 is inserted and fixed in the through hole of the ceramic capillary 18. The ceramic capillary 18 has a slant end surface 18a inclined about 20° with respect to a vertical direction. A semiconductor optical element 22 such as a photodiode (PD) is mounted on the slant end surface 18a of the ceramic capillary 18 so as to be optically coupled to the optical fiber 20 fixed in the ceramic capillary 18.

Figure 4:
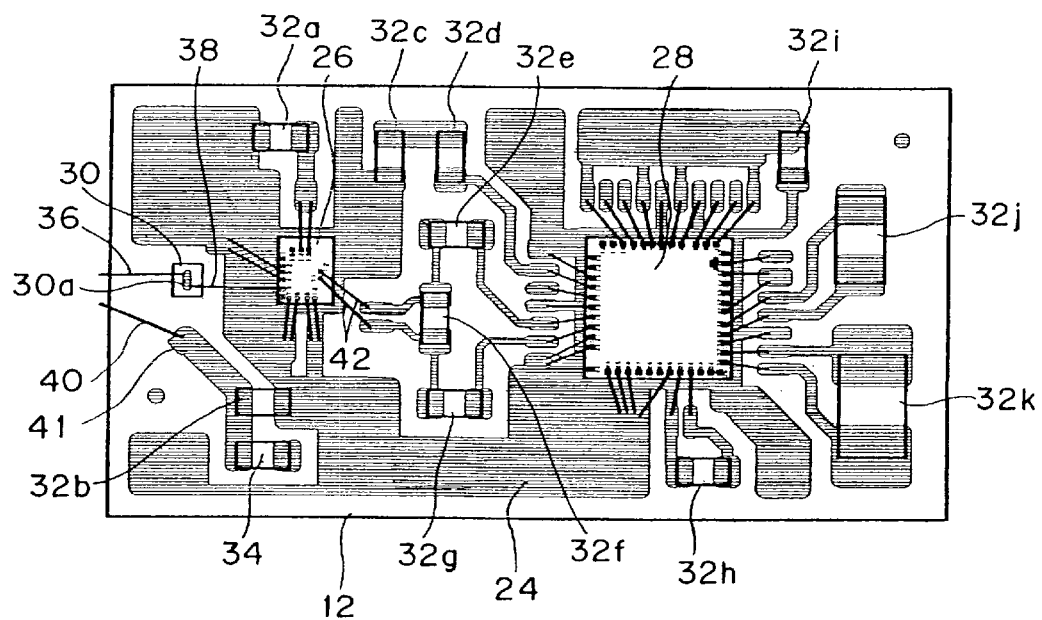
FIG. 4 is a top plan view of a printed wiring board on which optical and electronic components are mounted : and wired in the optical receiving device.

Referring again to FIG. 1, a ground pattern 24 is formed on the upper surface of the printed wiring board 12. A preamplifier integrated circuit (IC) 26 as a first electrical circuit and a main amplifier integrated circuit (IC) 28 as a second electrical circuit are mounted on the printed wiring board 12. A relay block 30 is also mounted on the printed wiring board 12. As best shown in FIG. 4, a plurality of capacitors 32a to 32k and a resistor 34 are also mounted on the printed wiring board 12. Referring to FIGS. 1 to 4, an output electrode of the PD 22 is connected through a wire 36 to a conductor pattern 30a of the relay block 30 by bonding. The conductor pattern 30a of the relay block 30 is connected through a wire 38 to the preamplifier IC 26 by bonding.

A bias electrode of the PD 22 is connected through a wire 40 to a conductor pattern 41 on the printed wiring board 12 by bonding. The conductor pattern 41 is connected to a bias source (not shown). The preamplifier IC 26 is-connected through a pair of wires 42 to conductor patterns on the printed wiring board 12 by bonding, and is further connected through the capacitors 32e to 32g to the main amplifier IC 28. As best shown in FIGS. 2 and 3A, the preamplifier IC 26 and the wires 36, 38, and 42 passing a feeble signal are covered with an internal shield 44. The internal shield 44 is formed from a steel sheet plated with nickel and gold.

Figure 5A:
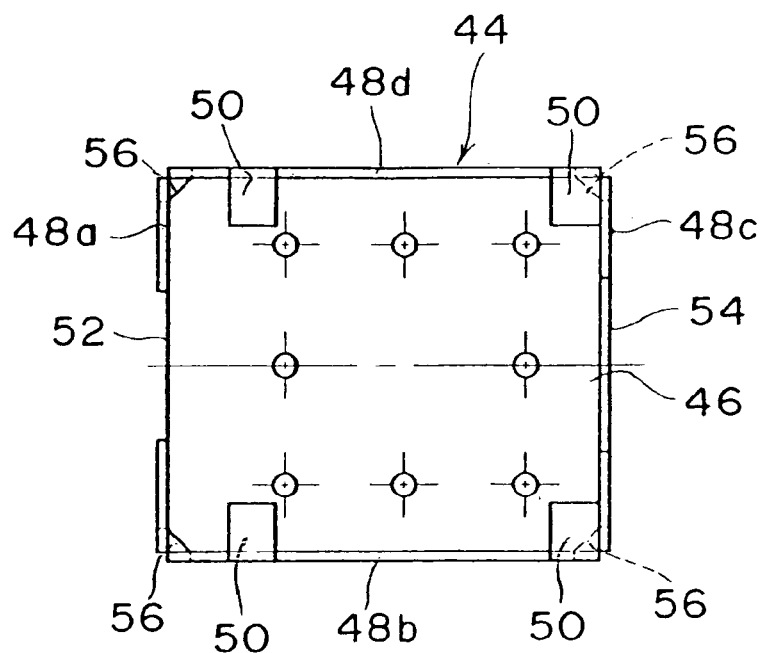
FIG. 5A is a bottom plan view of the internal shield.
Figure 5B:
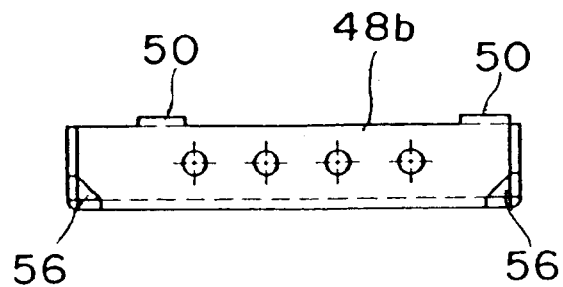
FIG. 5B is a front view of FIG. 5A.
Figure 6A:
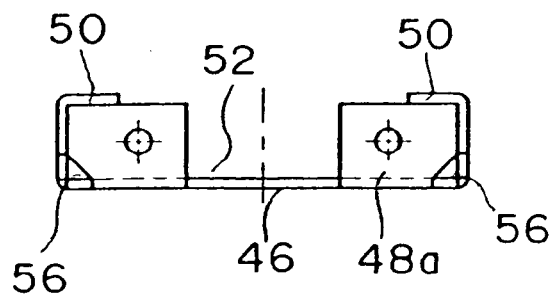
FIG. 6A is a left side view of FIG. 5A.
Figure 6B:
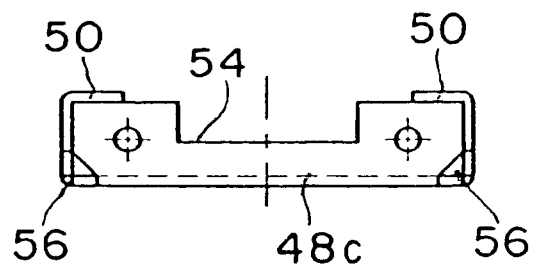
FIG. 6B is a right side view of FIG. 5A.

As shown in FIGS. 5A to 6B, the internal shield 44 has a substantially boxlike shape opening on its bottom side. FIG. 5A is a bottom plan view of the internal shield 44, FIG. 5B is a front view of FIG. 5A, FIG. 6A is a left side view of FIG. 5A, and FIG. 6B is a right side view of FIG. 5A. The internal shield 44 has a top plate 46 and four side plates 48a to 48d integrated with the top plate 46. The side plate 48b is integrally formed at its bottom end (its upper end as viewed in FIGS. 5A to 6B) with two horizontal projections 50. Similarly, the side plate 48d opposed to the side plate 48b is integrally formed at its bottom end (its upper end as viewed in FIGS. 5A to 6B) with two horizontal projections 50 opposed to the two horizontal projections 50 of the side plate 48b. The internal shield 44 is fixedly mounted on the ground pattern 24 of the printed wiring board 12 by applying a conductive adhesive such as silver epoxy to the four horizontal projections 50 of the side plates 48b and 48d.

As shown in FIG. 6A, the side plate 48a is formed with a cutout 52. Similarly, the side plate 48c opposed to the side plate 48a is also formed with a cutout 54 as shown in FIG. 6B. These cutouts 52 and 54 are formed in order to allow the flowing of a resin in a molding process and to facilitate the injection of the resin into the inside of the internal shield 44. Further, the internal shield 44 is formed at its four top corners (lower corners as viewed in FIGS. 5A to 6B) with four holes 56 as air vents in the molding process.

As shown in FIGS. 3A and 3B, all of the lead frame 10, the printed wiring board 12, the preamplifier IC 26, the PD 22, the wires 36, 38, 40, and 42, the internal shield 44, and the ferrule assembly 14 except a part of each lead 10a, an end portion of the ceramic capillary 18, and a part of the metal member 16 are hermetically sealed by a resin mold package 60 shown by a phantom line. This molding is performed by pouring a molding resin between an upper die and a lower die.

As shown in FIGS. 6A and 6B, the cutouts 52 and 54 are formed in the opposed side plates 48a and 48c of the internal-shield 44, and the air vent holes 56 are formed at the four corners of the internal shield 44. Accordingly, the inside of the internal shield 44 can be filled with the resin in the molding process, so that the components including the preamplifier IC 26 covered with the internal shield 44 can be reliably hermetically sealed with the molding resin. Further, the resin mold package 60 is in sealing contact with the ferrule assembly 14 at the cylindrical portion 16a of the metal member 16. Accordingly, a resin burr generated in the molding process is prevented from sticking to the ceramic capillary 18, so that the connection loss by an optical connector can be reduced.

Figure 7:
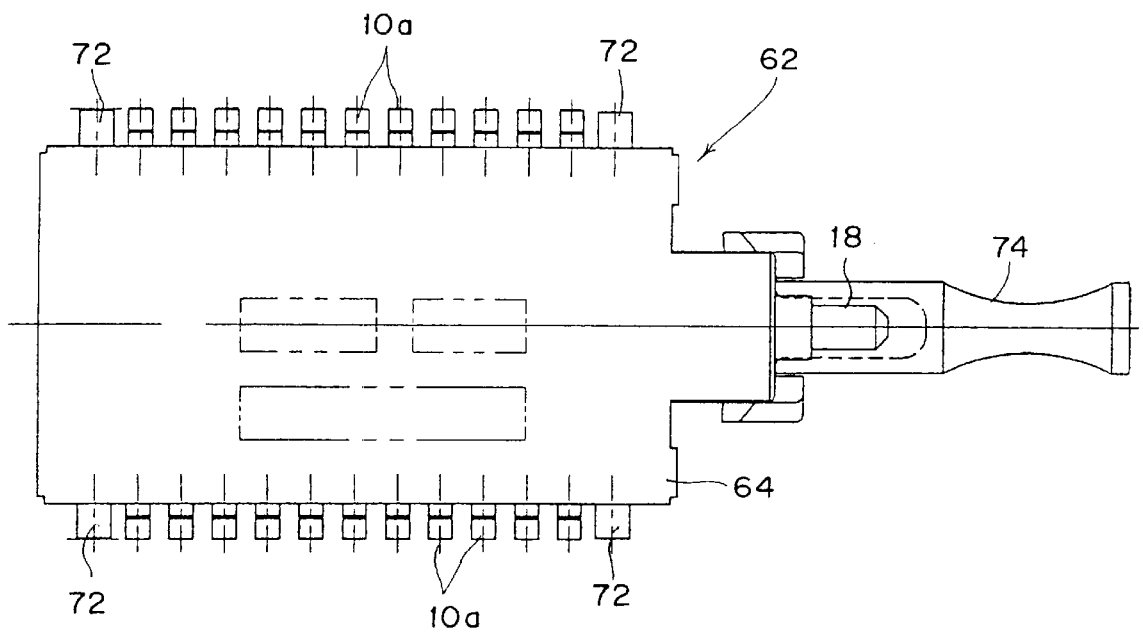
FIG. 7 is an external top plan view of an optical receiving device according to a second preferred embodiment of the present invention.
Figure 8:
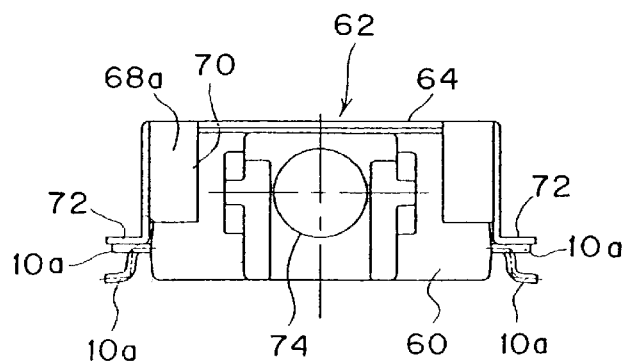
FIG. 8 is a right side view of FIG. 7.
Figure 9A:
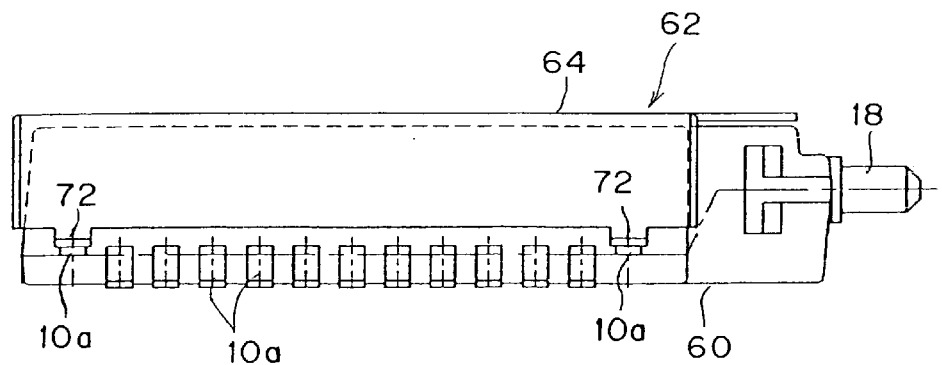
FIG. 9A is a front view of FIG. 7.
Figure 9B:
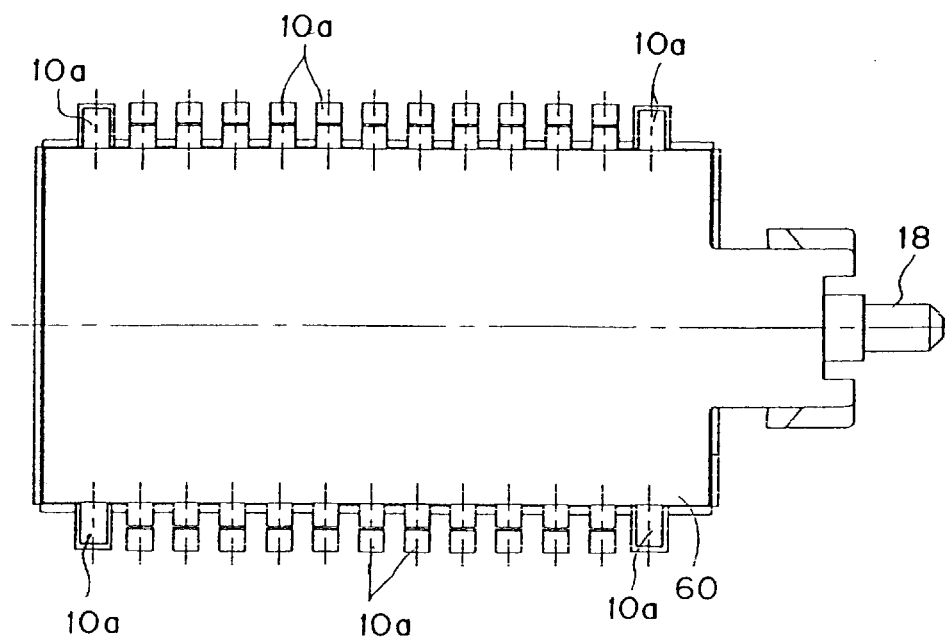
FIG. 9B is a bottom plan view of FIG. 7.

A second preferred embodiment of the optical receiving device according to the present invention will now be described with reference to FIGS. 7 to 11B. FIG. 7 is an external top plan view of an optical receiving device 62 according to the second preferred embodiment, FIG. 8 is a right side view of FIG. 7, FIG. 9A is a front view of FIG. 7, and FIG. 9B is a bottom plan view of FIG. 7. The optical receiving device 62 according to the second preferred embodiment is different from the optical receiving device 8 according to the first preferred embodiment in that the internal shield 44 of the optical receiving device 8 is removed and that an external shield 64 is provided to cover the resin mold package 60. The other configuration of the second preferred embodiment is similar to that of the first preferred embodiment.

Figure 10A:
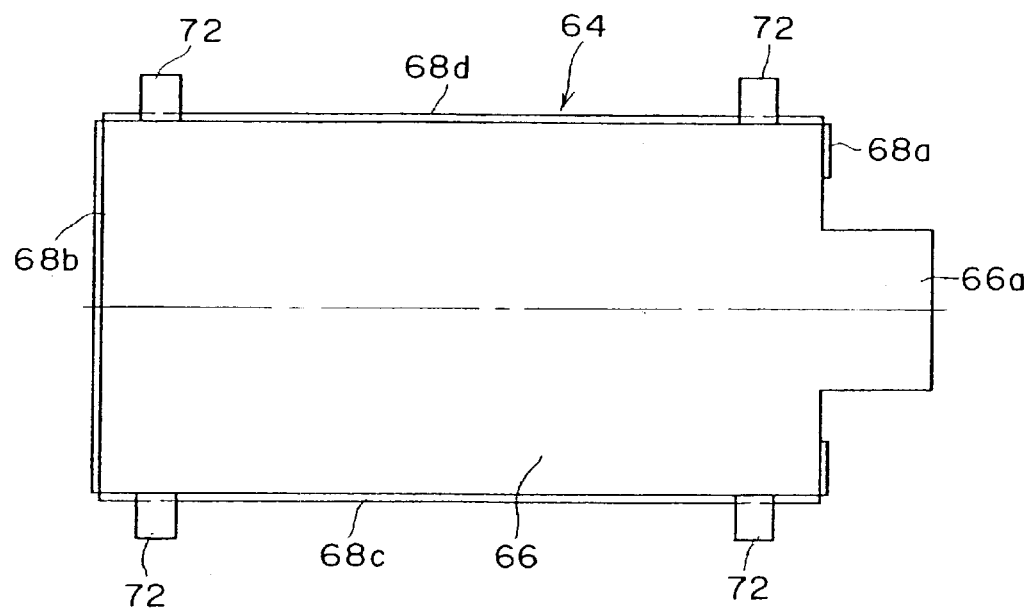
FIG. 10A is a bottom plan view of an external shield in the second preferred embodiment.
Figure 10B:
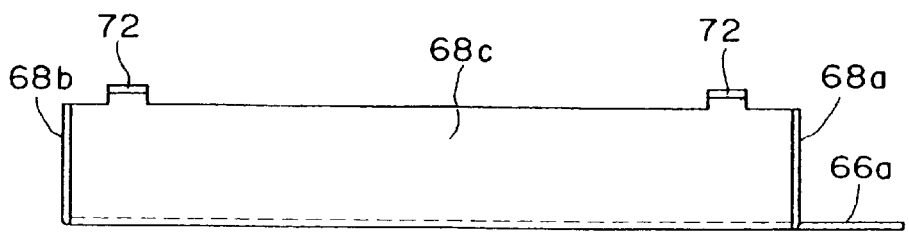
FIG. 10B is a front view of FIG. 10A.
Figure 11A:
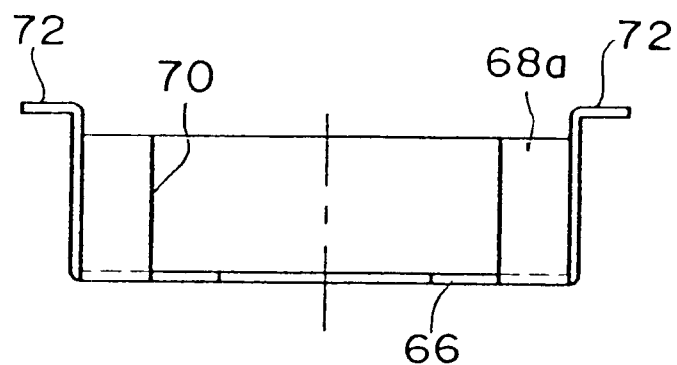
FIG. 11A is a right side view of FIG. 11A.
Figure 11B:
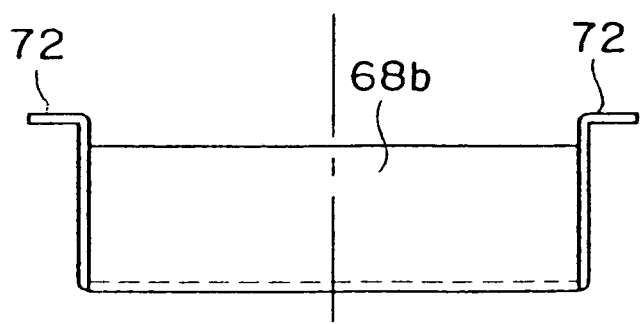
FIG. 11B is a left side view of FIG. 10A.

FIG. 10A is a bottom plan view of the external shield 64, FIG. 10B is a front view of FIG. 10A, FIG. 11A is a right side view of FIG. 10A, and FIG. 11B is a left side view of FIG. 10A. The external shield 64 is formed from a steel sheet plated with nickel and gold. The external shield 64 has a substantially boxlike shape opening on its bottom side, that is, it has a top plate 66 and four side plates 68a to 68d integrated with the top plate 66.

The top plate 66 has a covering projection 66a for partially covering the ferrule assembly 14. As shown in FIGS. 8 and 11A, the side plate 68a is formed with a cutout 70 for receiving the ferrule assembly 14. The side plate 68c is integrally formed at its bottom end (its upper end as viewed in FIGS. 10A to 11B) with two horizontal projections 72. Similarly, the side plate 68d opposed to the side plate 68c is integrally formed at its bottom end (its upper end as viewed in FIGS. 10A to 11B) with two horizontal projections 72 opposed to the two horizontal projections 72 of the side plate 68c. The external shield 64 is fixedly mounted on the resin mold package 60 by mounting the four horizontal projections 72 of the side plates 68c and 68d on four specific flat leads 10a and welding the projections 72 to the flat leads 10a.

Thus, the external shield 64 is fixed by welding to the flat leads 10a of the lead frame 10, so that the external shield 64 can be grounded to the lead frame 10. Further, the external shield 64 covers the whole of the optical receiving device, thereby exhibiting a large shielding effect. Reference numeral 74 shown in FIG. 7 denotes a protective member for protecting the ceramic capillary 18. The protective member 74 is fitted to the cylindrical portion 16a of the metal member 16 of the ferrule assembly 14 during transportation of the optical receiving device 62 for the purpose of protection of the ceramic capillary 18. However, the protective member 74 is removed when connecting the optical receiving device 62 to an external optical fiber using an optical connector.

Figure 12:
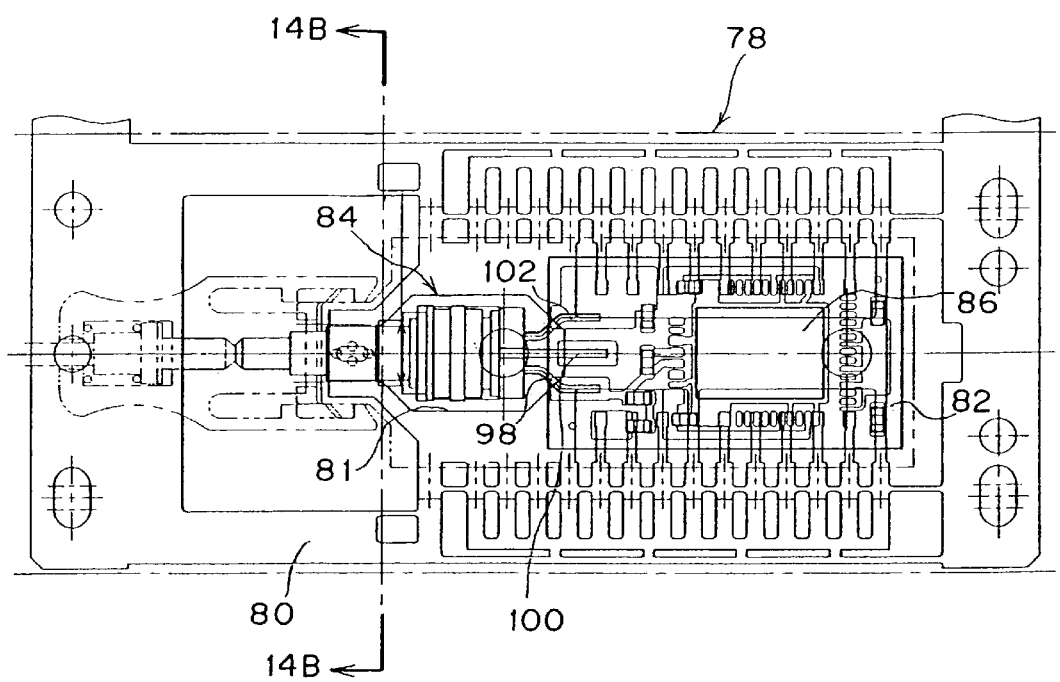
FIG. 12 is a top plan view of an optical transmitting device according to a preferred embodiment of the present invention in the condition before lead forming.
Figure 14A:
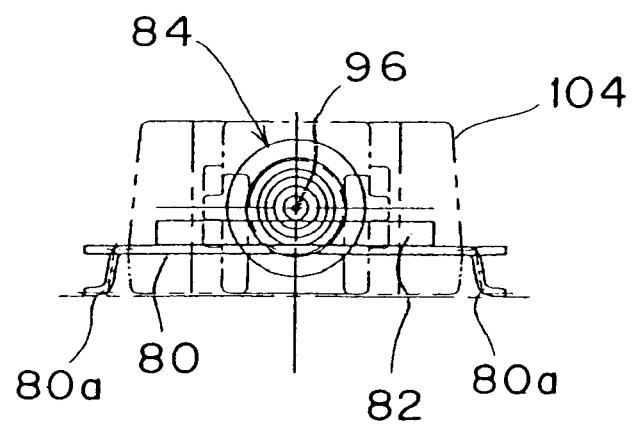
FIG. 14A is a left side view of the optical transmitting device.
Figure 14B:
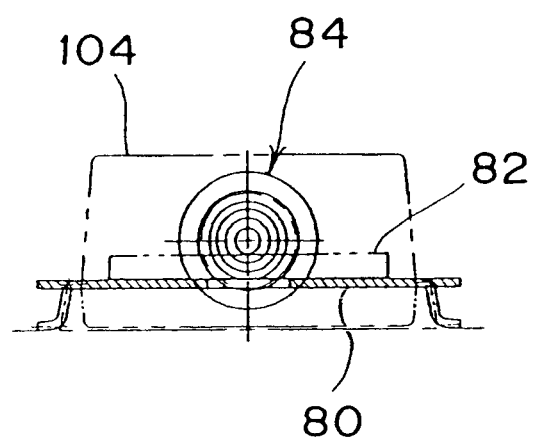
FIG. 14B is a cross section taken along the line 14B—14B in FIG. 12.

A preferred embodiment of the optical transmitting device according to the present invention will now be described with reference to FIGS. 12 to 17B. FIG. 12 is a top plan view of an optical transmitting device 78 according to the preferred embodiment in the condition before lead forming. FIG. 13 is a front view of the optical transmitting device 78 in the condition after lead forming, FIG. 14A is a left side view of FIG. 13, and FIG. 14B is a cross section taken along the line 14B—14B in FIG. 12.

As shown in FIG. 13, a printed wiring board 82 and a laser diode (LD) module 84 are mounted on a lead frame 80 having a plurality of leads 80a. The LD module 84 includes an LD package 88 incorporating a laser diode (LD) and a lens, and a ferrule assembly 90 fixed to the LD package 88. The ferrule assembly 90 has a metal member 92 having a bore, a ceramic (e.g., zirconia) capillary 94 inserted and fixed in the bore of the metal member 92, and an optical fiber 96 inserted and fixed in the ceramic capillary 94.

As shown in FIG. 12, the lead frame 80 has an opening 81. The LD module 84 is mounted on the lead frame 80 by partially inserting the LD package 88 of the LD module 84 in the opening 81 and next welding the metal member 92 of the ferrule assembly 90 to the lead frame 80. A driver integrated circuit (IC) 86 as an electrical circuit for driving the LD is mounted on the printed wiring board 82. The LD is driven by the driver IC 86 through a pair of electrodes 98 and 100 shown in FIG. 12. Reference numeral 102 shown in FIG. 12 denotes an electrode for a monitoring photodiode (PD) accommodated in the LD package 88.

Figure 15:
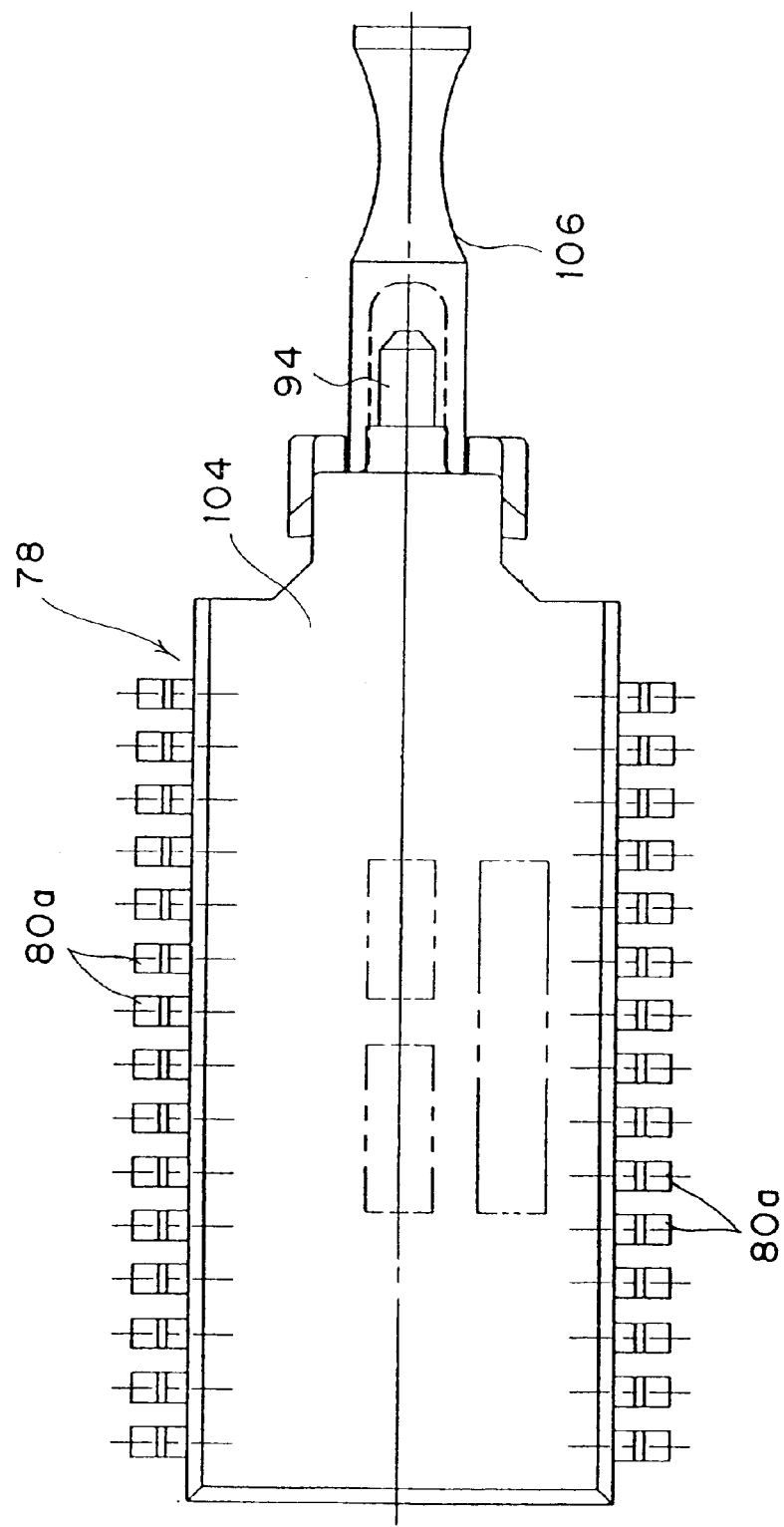
FIG. 15 is an external top plan view of the optical transmitting device.
Figure 16:
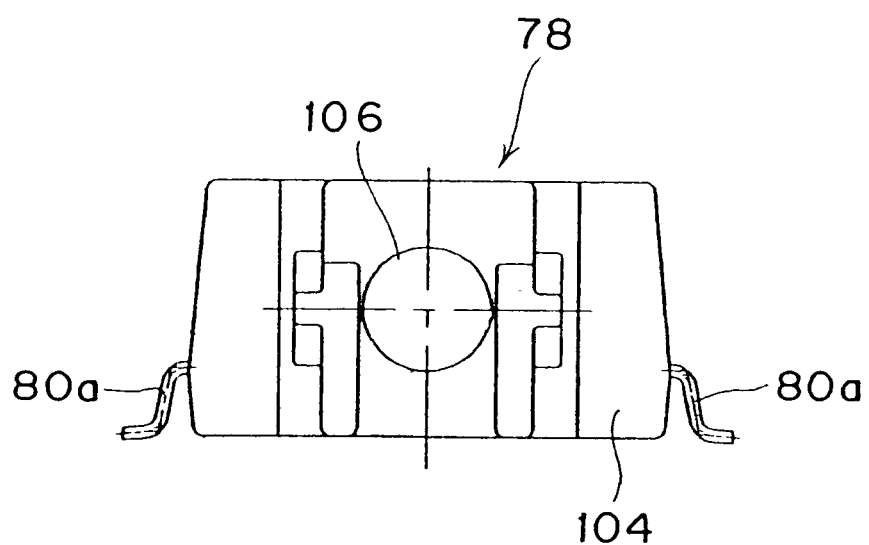
FIG. 16 is a right side view of FIG. 15.
Figure 17A:
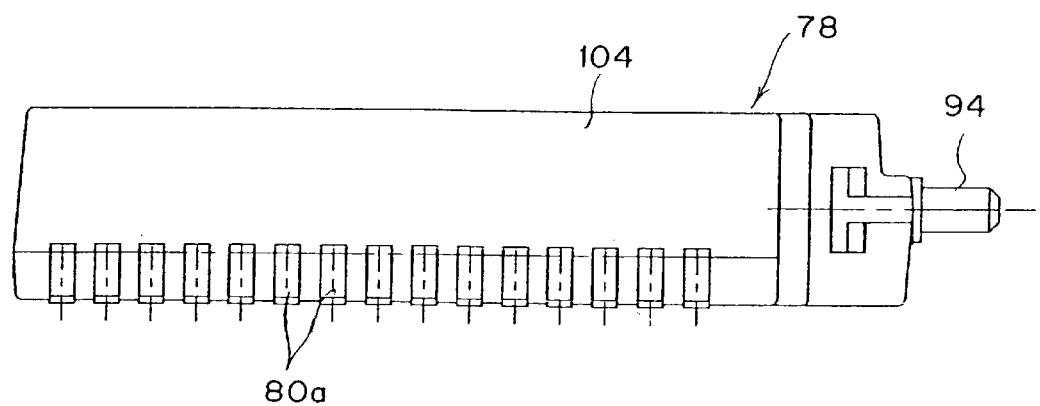
FIG. 17A is a front view of FIG. 15.
Figure 17B:
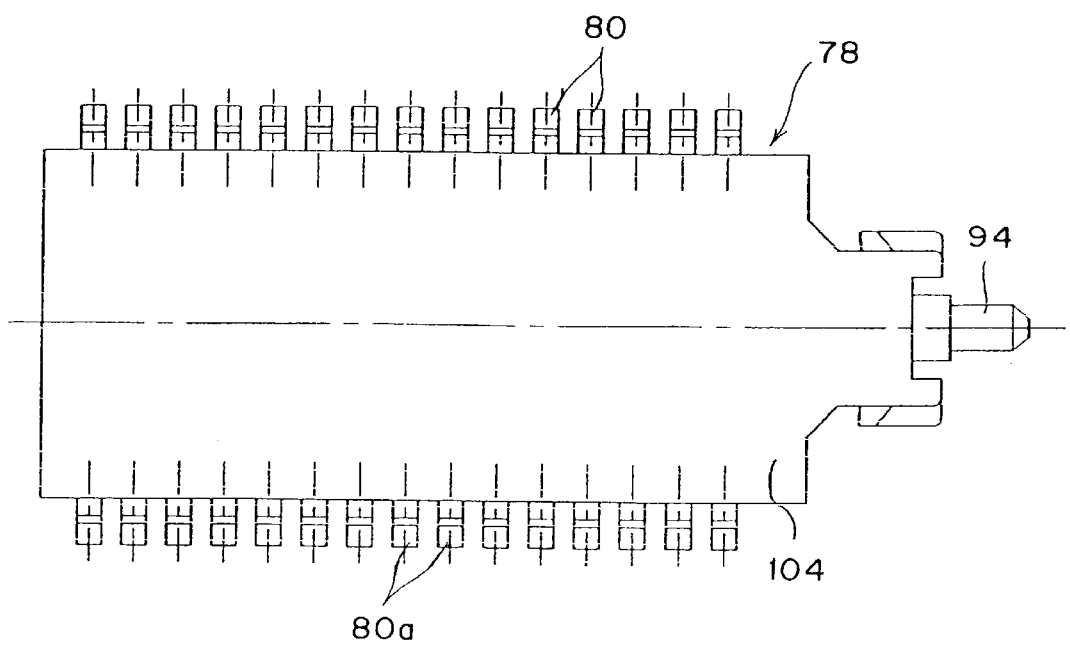
FIG. 17B is a bottom plan view of FIG. 15.

FIG. 15 is an external top plan view of the optical transmitting device 78, FIG. 16 is a right side view of FIG. 15, FIG. 17A is a front view of FIG. 15, and FIG. 17B is a bottom plan view of FIG. 15. All of the lead frame 80, the printed wiring board 82, the driver IC 86, and the LD module 84 except a part of each lead 80*a*, an end portion of the ceramic capillary 94, and a part of the metal member 92 are hermetically sealed by a resin mold package 104.

Reference numeral 106 shown in FIG. 15 denotes a protective member for protecting the ceramic capillary 94. The protective member 106 is fitted to the metal member 92 as shown in FIG. 15 during transportation of the optical transmitting device 78 for the purpose of protection of the ceramic capillary 94. In the optical transmitting device 78, the metal member 92 of the LD module 84 is fixed by welding to the lead frame 80, so that heat generated from the LD can be efficiently radiated to the lead frame 80.

According to the optical receiving device of the present invention as described above, the immunity to electromagnetic interference can be improved. Further, since the printed wiring board, optical components, and electronic components can be automatically mounted by using an automated mounter, the assembly workability in assembling the optical receiving device can be improved.

According to the optical transmitting device of the present invention, the light emitting element module is fixed by welding through the metal member to the lead frame. Accordingly, heat generated from the light emitting element can be efficiently radiated to the lead frame.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device comprising:
    a lead frame having a plurality of leads;
    a printed wiring board mounted on said lead frame and having a ground pattern;
    a ferrule assembly including a metal member, optical fiber holding means fixed to said metal member and having a through hole, and an optical fiber inserted and fixed in said through hole of said optical fiber holding means, said metal member being fixed to said lead frame;
    a semiconductor optical element fixedly mounted on an end face of said optical fiber held by said optical fiber holding means;
    an electrical circuit mounted on said printed wiring board;
    a wire for connecting said semiconductor optical element and said electrical circuit;
    an internal shield fixedly mounted on said ground pattern of said printed wiring board for covering said electrical circuit and said wire; and
    a resin mold package for enclosing all of said lead frame, said printed wiring board, said electrical circuit, said semiconductor optical element, said wire, said internal shield, and said ferrule assembly except a part of each of said leads, a part of said optical fiber holding means, and a part of said metal member.

2. An optical device according to claim 1, wherein said internal shield is formed of metal, and has a cutout for allowing injection of a molding resin into said internal shield and at least one air vent.

3. An optical device according to claim 1, wherein said metal member has a cylindrical portion, and said resin mold package seals said ferrule assembly at said cylindrical portion.

4. An optical device according to claim 1, wherein said electrical circuit comprises a preamplifier integrated circuit, and said optical device further comprises a main amplifier integrated circuit mounted on said printed wiring board.

5. An optical device comprising:
    a lead frame having a plurality of leads;
    a printed wiring board mounted on said lead frame;
    a ferrule assembly including a metal member, optical fiber holding means fixed to said metal member and having a through hole, and an optical fiber inserted and fixed in said through hole of said optical fiber holding means, said metal member being fixed to said lead frame;
    a semiconductor optical element fixedly mounted on an end face of said optical fiber held by said optical fiber holding means;
    an electrical circuit mounted on said printed wiring board;
    a wire for connecting said semiconductor optical element and said electrical circuit;
    a resin mold package for enclosing all of said lead frame, said printed wiring board, said electrical circuit, said semiconductor optical element, said wire, and said ferrule assembly except a part of each of said leads, a part of said optical fiber holding means, and a part of said metal member; and
    an external shield mounted on said resin mold package so as to cover said resin mold package.

6. An optical device according to claim 5, wherein said external shield is fixed by welding at a plurality of positions to said leads.

7. An optical device according to claim 5, wherein said metal member has a cylindrical portion, and said resin mold package seals said ferrule assembly at said cylindrical portion.

8. An optical device according to claim 5, wherein said electrical circuit comprises a preamplifier integrated circuit, and said optical device further comprises a main amplifier integrated circuit mounted on said printed wiring board.

9. An optical device comprising:
    a lead frame having a plurality of leads;
    a printed wiring board mounted on said lead frame;
    an optical element module including an optical element package having a semiconductor optical element, and a ferrule assembly having a metal member, optical fiber holding means inserted and fixed in said metal member, and an optical fiber inserted and fixed in said optical fiber holding means, said metal member being fixed to said optical element package and fixedly mounted on said lead frame;
    an electrical circuit mounted on said printed wiring board; and
    a resin mold package for enclosing all of said lead frame, said printed wiring board, said electrical circuit, and said optical element module except a part of each of said leads, an end portion of said optical fiber holding means, and a part of said metal member.

10. An optical receiving device comprising:
    a lead frame having a plurality of leads;
    a printed wiring board mounted on said lead frame and having a ground pattern;

a ferrule assembly including a metal member having a bore, a ceramic capillary having a through hole, a first end portion, a second end portion, and an intermediate portion between said first and second end portions, said intermediate portion being inserted and fixed in said bore of said metal member, and an optical fiber inserted and fixed in said through hole of said ceramic capillary, said metal member being fixedly mounted on said lead frame;

a photodetecting element fixedly mounted on an end surface of said first end portion of said ceramic capillary;

a preamplifier integrated circuit mounted on said printed wiring board;

a wire for connecting said photodetecting element and said preamplifier integrated circuit;

an internal shield fixedly mounted on said ground pattern of said printed wiring board for covering said preamplifier integrated circuit and said wire; and a resin mold package for enclosing all of said lead frame, said printed wiring board, said preamplifier integrated circuit, said photodetecting element, said wire, said internal shield, and said ferrule assembly except a part of each of said leads, said second end portion of said ceramic capillary, and a part of said metal member.

11. An optical receiving device comprising:

a lead frame having a plurality of leads;

a printed wiring board mounted on said lead frame;

a ferrule assembly including a metal member having a bore, a ceramic capillary having a through hole, a first end portion, a second end portion, and an intermediate portion between said first and second end portions, said intermediate portion being inserted and fixed in said bore of said metal member, and an optical fiber inserted and fixed in said through hole of said ceramic capillary, said metal member being fixedly mounted on said lead frame;

a photodetecting element fixedly mounted on an end surface of said first end portion of said ceramic capillary;

a preamplifier integrated circuit mounted on said printed wiring board;

a wire for connecting said photodetecting element and said preamplifier integrated circuit;

a resin mold package for enclosing all of said lead frame, said printed wiring board, said preamplifier integrated circuit, said photodetecting element, said wire, and said ferrule assembly except a part of each of said leads, said second end portion of said ceramic capillary, and a part of said metal member; and an external shield mounted on said resin shield package so as to cover said resin mold package.

12. An optical transmitting device comprising:

a lead frame having a plurality of leads;

a printed wiring board mounted on said lead frame;

a light emitting element module including a light emitting element package having a light emitting element, and a ferrule assembly having a metal member, a ceramic capillary inserted and fixed in said metal member, and an optical fiber inserted and fixed in said ceramic capillary, said metal member being fixed to said light emitting element package and fixedly mounted on said lead frame;

a light emitting element driving integrated circuit mounted on said printed wiring board; and a resin mold package for enclosing all of said lead frame, said printed wiring board, said light emitting element driving integrated circuit, and said light emitting element module except a part of each of said leads, an end portion of said ceramic capillary, and a part of said metal member.

* * * * *